350-6.5 SR
XR 3,305,834
SEARCH ROOM
Feb. 21, 1967 — L. COOPER ETAL — 3,305,834
SUBSTITUTE FOR MISSING XR
OPTICAL SYSTEM UTILIZING FRAUNHOFER DIFFRACTION PATTERNS FOR SPECIMEN IDENTIFICATION PURPOSES
Filed Dec. 31, 1963 — 2 Sheets-Sheet 1
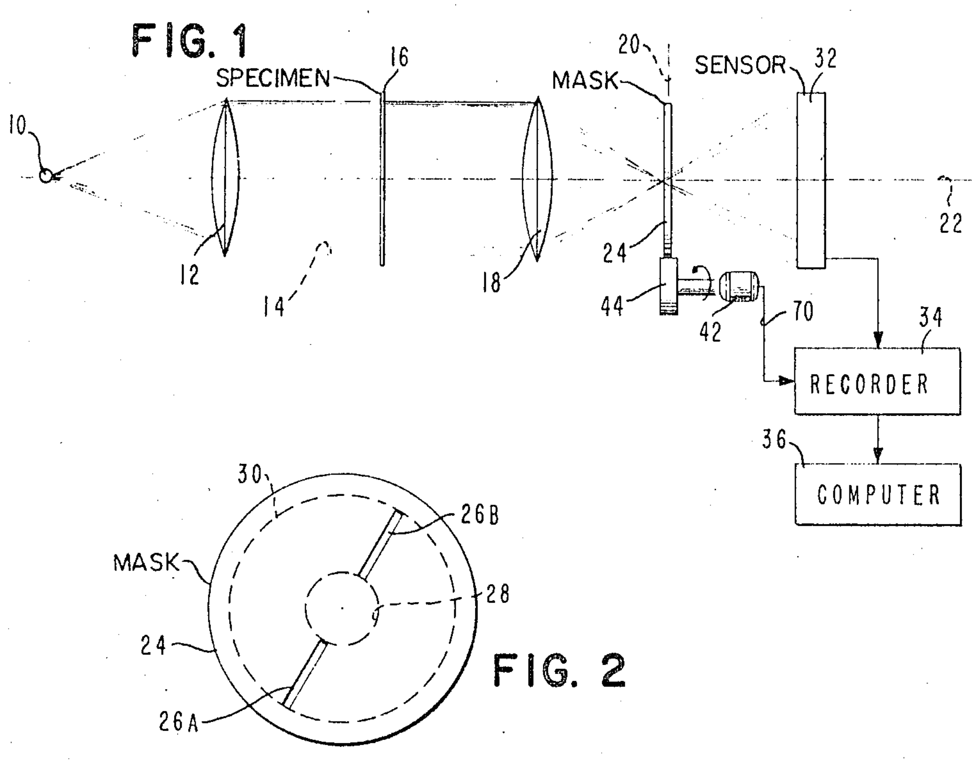
FIG. 1, FIG. 2
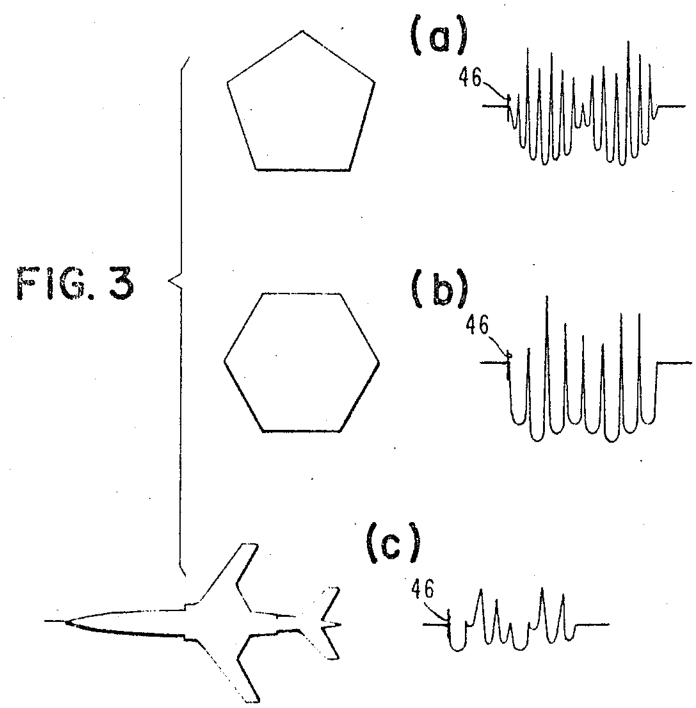
INVENTORS
LAWRENCE COOPER
RICHARD W. KERN
BY Edgar H. Kent
ATTORNEY United States Patent Office 3,305,834

Patented Feb. 21, 1967

3,305,834

OPTICAL SYSTEM UTILIZING FRAUNHOFER DIFFRACTION PATTERNS FOR SPECIMEN IDENTIFICATION PURPOSES

Lawrence Cooper, Endwell, and Richard W. Kern, Vestal, N.Y., assignors to International Business Machines Corporation, New York, N.Y., a corporation of New York Filed Dec. 31, 1963, Ser. No. 334,806
8 Claims. (Cl. 340—146.3)

This invention relates to optical systems, and more particularly to optical systems utilizing Fraunhofer diffraction patterns for specimen identification purposes.

Advantages flowing from the use of Fraunhofer diffraction patterns in character recognition devices as taught in the Shelton Patent 3,064,519, for example, are due in large part to the registration invarient characteristics of Fraunhofer diffraction patterns. In that system a two dimensional diffraction pattern was produced, and the nature of the produced pattern was detected by pattern comparison techniques. However, major problems in identifying the nature of the character which produced the diffraction pattern none the less exist, particularly where the configuration of a character varies as in different type fonts.

It is an object of this invention to provide novel and improved identification apparatus and methods employing Fraunhofer diffraction pattern techniques.

Another object of the invention is to provide novel and improved character recognition methods and apparatus employing characters which retain their visually identifyable forms.

Another object of the invention is to provide novel and improved apparatus for reading two dimensional records containing a plurality of characters.

Objects of the invention are achieved in a specimen identification system in which the Fraunhofer diffraction pattern of the specimen to be identified is angularly scanned. This angular scan produces an output signal of varying intensity as a function of the diffraction pattern, which output signal may be analyzed by computer techniques to identify the character or pattern that is to be identified.

In an augmented embodiment of the invention, the data characters are coded in a diffraction grating configuration, and this angular scanning technique enables the selective gating of images of individual characters, and also facilitates determination of the coordinate location and identification of all the characters on a page, for example, without any movement of that page relative to the optical system.

The foregoing and other objects, features and advantages of the invention will be apparent from the following more particular description of preferred embodiments of the invention, as illustrated in the accompanying drawings, in which:

FIG. 1 is a schematic diagram of apparatus embodying the invention;

FIG. 2 is a front view of the Franhofer diffraction plane mask employed in the apparatus of FIG. 1;

FIG. 3 is a series of diagrams indicating the type of output signals produced by the apparatus shown in FIG. 1;

Figures 4, 6:
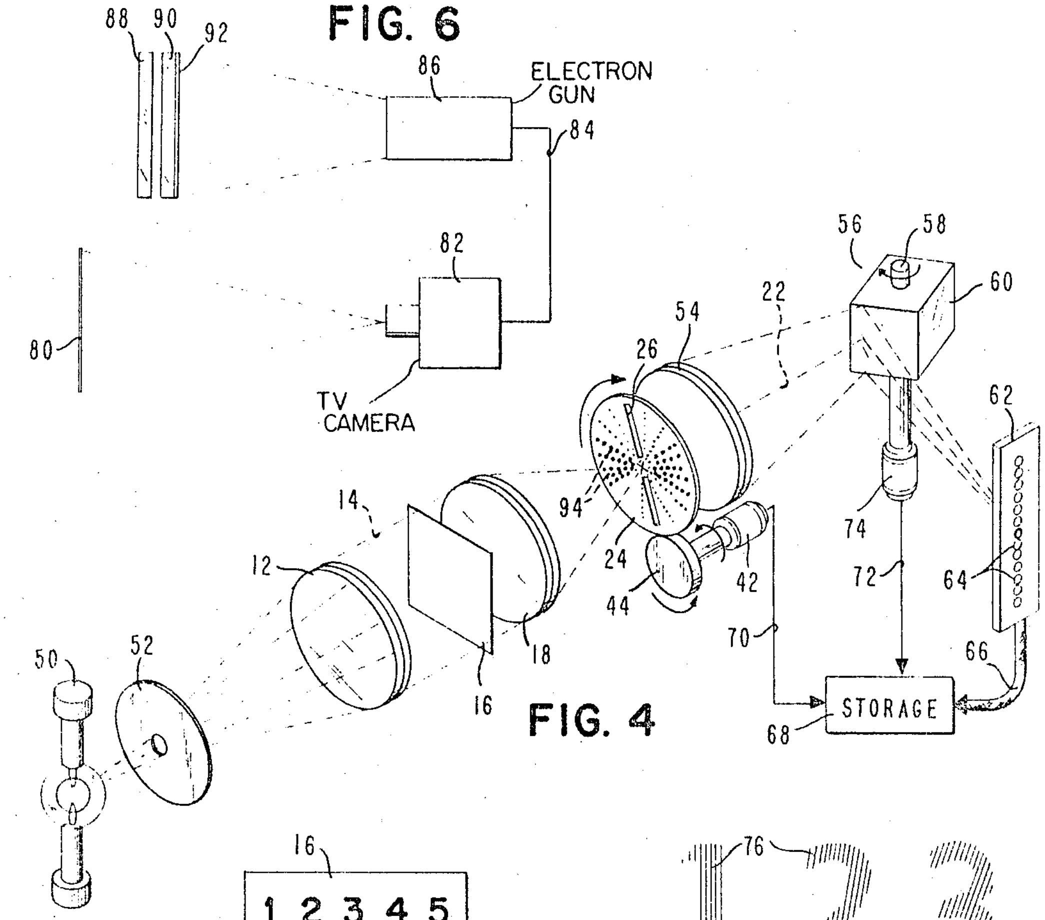
FIG. 4 is a schematic diagram of an augmented embodiment of the invention for identifying a plurality of characters disposed in a two-dimensional arrangement.
Figure 7:
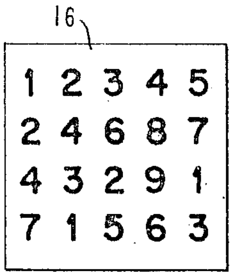
Figure 5:
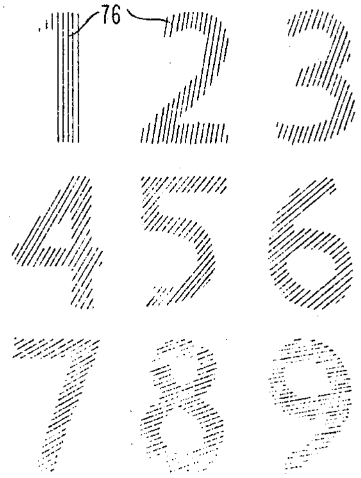

FIG. 5 indicates an illustrative form of character configuration employed in the apparatus in FIG. 4;

FIG. 6 is a mechanism that may be employed for producing transparent characters for use in the mechanism shown in FIG. 4 from opaque members;

FIG. 7 is a diagram of an illustrative data page; and

Figure 8:
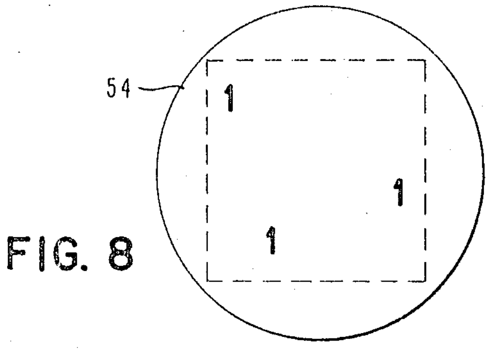

FIG. 8 is a diagram of the images produced in one position of the angularly scanning mask in the system shown in FIG. 4 in response to the input information of FIG. 7.

With reference to FIG. 1, the system includes a source of monochromatic light 10. If the light is incoherent in nature, the source should closely approximate a point source and conventional masks, for example the type shown in FIG. 4 at 52, may be employed to facilitate this. Such auxiliary components are unnecessary where a source of coherent light (a HeNe laser, for example) is employed. A collimating lens 12 is used with a source of incoherent light, the source being positioned at the focal point of lens 12, so that a group of parallel rays 14 emanate from the lens. A group of parallel rays from a coherent light source are located as desired by conventional means, for example, with an aspheric corrector for the Gaussian intensity distribution of the uniphase TEMoo mode, yielding an intensity distribution of uniform cross section. The specimen 16 is positioned in the group of parallel light rays. The specimen can include either a relatively transparent pattern on a relatively opaque background or a relatively opaque pattern on a reltaively transparent background. A converging lens 18 then focuses the light energy transmitted through specimen 16 through a diffraction plane 20 (at the focal point of lens 18).

In this diffraction plane a Fraunhofer diffraction pattern of the specimen pattern is formed. This diffraction pattern is characterized by its registration invarient characteristics. That is, the diffraction pattern formed by a particular specimen pattern is always of the same configuration and located at the same point in the diffraction plane independent of the rectangular coordinate location of the specimen pattern in the beam 14 of parallel rays. The diffraction pattern location is centered on the optical axis 22 of the system.

A mask 24 is positioned in the diffraction plane and is mounted for rotation about optical axis 22 and is driven suitably for angularly scanning the Fraunhofer diffraction pattern of the specimen, for example in steps or continuously. This mask (as shown in FIG. 2) has a radially extending slit 26 disposed therein and the intensity of the light passing through the slit is sensed as a function of the angular position of the slit in the angular scanning operation. The width of slit 26 is primarily a function of the wave length of light employed and the focal length of lens 18—a typical value being in the order of 0.002 inch. It is preferred that the slit have two segments 26A and 26B with the center portion of the disc being opaque as that portion of the optical system is common to all diffraction patterns and thus contains redundant information.

The radial lengths of the two sections 26A, 26B are equal. That length, however, is advantageously varied for selective gating purposes. For example, where it is desired to sense only well-delineated portions, the radius 28 of the opaque center portion is increased. Similarly, if it is desired to delete sharply defined portions, such as telephone lines in a photograph, and sense only the less well-defined objects, such as cloud patterns for example, the outer radius 30 defining the slit length is shortened.

Light energy passing through slit 26 in the mask 24 impinges on sensing element 32. That element has a large light sensitive surface of uniform response disposed perpendicular to optical axis 22, such that all the light energy passed by slit 26 will be sensed thereby. The output of the sensing element is proportional to the total amount of light falling thereon, and that output is applied to a recorder 34, such as a tape recorder or other suitable device. The angular scan of the diffraction pattern produced by the specimen produces a sensing element output that varies as a function of the diffraction pattern and the angular position of slit 26. This output is stored by recorder 34 for subsequent analysis by a suitable processer 36, such as a digital computer programmed to distinguish between the different intensity records produced by various specimens and identify the specimens on the basis of such records.

A group of typical specimen patterns and the intensity records thereof are shown in FIG. 3. It will be noted that each intensity record differs from the other records and thus affords a basis for distinguishing and identifying the specimen. (It is frequently helpful to synchronize the recorder with the angular scan by employing a transducer 42 coupled to disc driver 44 to generate a cyclical signal for insertion in the record as marker 46 corresponding, for example, to the 0° position of slit 26.)

Further useful identification features may be obtained with the apparatus shown in FIG. 4. The same basic optical components are employed including a mask 24 with radial slit 26. The light source 50, as shown, is a high pressure mercury arc lamp. A mask 52 is used to limit the cone of light impinging on collimating lens 12. An output lens element 54 is substituted for sensing element 32. In addition, there is provided a scanning mirror element in the form of a cube 56 which is mounted on shaft 58 for rotation about an axis intersecting and perpendicular to the optical axis 22 of the sensing system. The cube has four reflecting faces 60 which reflect light from images formed at lens element 54 onto a bank 62 of vertically aligned photocells 64. Outputs from the photocells 64 are applied over cable 66 to storage unit 68. Angular position data from mask 24, supplied from transducer 42 over line 70, and from reflector 56, supplied on line 72 from transducer 74, are gated into storage by the photocell outputs. It will be clear that this illustrated mechanism is exemplary and that other scanning devices and sensor arrangements may also be employed in the practice of the invention.

The characters on the sheet 16 to be read are in coded form of the type indicated generally in FIG. 5. Alphanumeric characters may be encoded for reading in the system while retaining their usual visually identifyable form. The additional characteristic employed is the use of a plurality of parallel lines 76 spaced in the order of 0.020 inch apart in the nature of a grating to form each character. It will be further noted that the angular position of the lines 76 of each character is different from the angular position of the lines 76 forming all the other characters. With a four degree differentiation between the angular orientation of character lines, for example, an angular differentiation more than adequate for discrimination purposes as hereinafter described, more than forty characters can be encoded for utilization in the system.

These characters are formed on a suitable medium so that there is a substantial difference between the transparency of the lines and the background. For example, they may be formed on a transparent dimensionally stable plastic film (such as that sold under the trademark Mylar) with approximately configured type. Where the characters are formed on an opaque material, the system shown in FIG. 6, which is of the Eidophor type, may be used. That system converts an opaque image into an image suitably transparent for sensing. An opaque document 80, having characters of the "grating" configuration formed thereon, is scanned by a television camera unit 82 and the resulting signals are fed over cable 84 to an electron gun 86. Two glass plates 88, 90 are positioned in the path of the beam from the electron gun and an electric charge is impressed therebetween. On one plate there is disposed an electrically conductive oil film 92. The electron beam from gun 86, as controlled by the signals on cable 84, impinges on the film 92 and deforms that film into the grating configuration of the characters on the document 80. The resulting varied transmissivity of the oil film is sufficient to produce characteristic diffraction patterns when the glass plates 88, 90 with film 92 are interposed in the optical system at the location of specimen 16.

The diffraction image produced by any one of the characters is a linear array of dots (diagrammatically indicated at 94 (FIG. 4)) that is systematically located with respect to the optical axis 22 and at an angle that is othogonal to the lines 76 of that character. When slit 26 of mask 24 is aligned with a particular image pattern, light from that diffraction pattern is transmitted to the image lens 54 so that only that particular character is visible. Thus, if, for example, the character "1" is composed of vertical lines (as shown in FIG. 5), its diffraction pattern is a horizontal linear array and images of only the "1"s will be formed at lens 54 when the slit 26 is in horizontal position. At the Fraunhofer diffraction plane all the diffraction patterns from characters of the same line orientation are superimposed (coincident with one another), so that mask 24 is an efficient gating mechanism. The style, shape, and size of the characters is immaterial where this parallel line type of encoding is utilized. Further, the images that are reproduced at the image lens 54 are located in positions corresponding to the position of the original characters on the document 16 and the locations are detected by the scanning and sensing equipment.

There is shown in FIG. 7 a table of numbers on a document 16 that are coded in the form shown in FIG. 5. When that document is being sensed and the disc slit 26 is in a horizontal position, only the "1"s will be transmitted and form images at lens 54. The location of those images is indicated in FIG. 8. Only the three "1"s are visible and their positions correspond to the positions of the "1"s on document 16. By scanning the image lens 54 with reflector 56 and correlating the angular position of the reflector with the photomultiplier outputs, the columnar positions of the "1"s may be recorded. Similarly, the photocell (or cells) that produces an output (or outputs) provides row information which is recorded in storage unit 68. Thus the angular position of slit 26 identifies the character and information applied over lines 66 and 72 identify the rectangular coordinate position of that character on specimen 16—the angular position of reflector 56 providing columnar information and the particular photocell 64 energized providing row information.

In the illustrated system angular position information of the mask 24 and scanner 56 is continuously available at storage unit 68, and sensor inputs over cable 66 gate that information together with sensor identity into storage. Mask 24 may be continuously rotating and at the end of each revolution, it may feed a scanner stepping signal to scanner 56 to rotate the scanner to a position for sensing the next column. Where such a scanner is employed, a column indicator feedback link may be employed to properly position the scanner. Thus, there is provided a system employing a single angularly scanning mask located in the Fraunhofer diffraction plane that enables reading of characters arranged in a two-dimensional configuration.

While the invention has been particularly shown and described with reference ot preferred embodiments thereof, it will be understood by those skilled in the art that various changes in form and details may be made therein without departing from the spirit and scope of the invention.

What is claimed is:

1. An optical system for specimen identification purposes comprising means for generating a Fraunhofer diffraction pattern of the specimen to be identified, a relatively opaque mask having a radially disposed, relatively transparent slit therein disposed in the diffraction plane of said generating means, means to rotate said slit about the major axis of the optical system, and
means for sensing radiant energy transmitted through said mask as a function of the angular position of said slit.

2. An optical system for specimen identification purposes comprising means for generating a beam of parallel light rays,
means for positioning in said beam of parallel light rays a surface having an area in the shape of the specimen to be identified of different transmissivity than the remainder of said surface,
a lens for focusing said beam of parallel light rays to a point in the optical axis of said system for forming a Fraunhofer diffraction pattern of the specimen on said surface,
a relatively opaque disc having a radially extending, relatively transparent slit disposed therein, said disc being positioned so that the center of said disc is at said focal point,
means to rotate said mask about said focal point, and
light sensing means positioned on the opposite side of said disc from said focusing lens responsive to light passing through said slit.

3. An optical system for specimen identification purposes comprising means for generating a beam of light rays along an optical axis,
means for positioning in said beam of light rays a surface having an area in the shape of the specimen to be identified, said specimen having different transmissivity than the remainder of said surface,
means for forming a Fraunhofer diffraction pattern of the specimen on said surface,
a relatively opaque mask having a radially extending, relatively transparent slit disposed therein, said mask being positioned at the location of said diffraction pattern,
means to rotate said mask about said optical axis to cause said slit to angularly scan said diffraction pattern, and
light sensing means positioned on the opposite side of said mask from said pattern forming means and responsive to light passing through said slit.

4. Character recognition apparatus comprising means for generating a beam of light rays along an optical axis,
means for positioning in said beam of light rays a surface including a plurality of characters having different transmissivity characteristics than the remainder of the surface
each said character being encoded in an angular dimension unique to that character,
means for forming Fraunhofer diffraction patterns of the characters positioned in said beam,
a relatively opaque mask having a radially extending relatively transparent slit disposed therein, said mask being positioned at the location of said diffraction patterns,
means to rotate said mask about said optical axis to cause said slit to angularly scan said diffraction patterns,
means positioned on the opposite side of said mask from said diffraction pattern forming means for forming images of said characters, and
means for recording slit angle information to identify the characters on said surface.

5. Character recognition apparatus comprising a point source of light,
a collimating leans for forming a beam of parallel light rays along an optical axis,
a surface including a plurality of characters having different transmissivity characteristics than the remainder of the surface positioned in said beam of parallel light rays,
each said character being encoded in an angular dimension unique to that character, a converging lens for forming Fraunhofer diffraction patterns of the characters positioned in said beam in the Fraunhofer plane of said converging lens,
a relatively opaque mask having an angular scan sector with a single radially extending, relatively transparent slit disposed therein, said mask being positioned in said Fraunhofer plane,
means to rotate said mask about said optical axis to cause said slit to angularly scan said diffraction patterns,
means positioned on the opposite side of said mask from said diffraction pattern forming means for forming images of said characters, and
means for recording slit angle information to identify the characters on said surface.

6. Character recognition apparatus comprising, means for generating a beam of parallel light rays,
means for positionnig in said beam of parallel light rays a surface including a plurality of characters having different transmissivity characteristics than the remainder of the surface,
each said character being composed of parallel lines disposed at an angle unique to that character,
a lens for focusing said beam of parallel light rays to a point for forming Fraunhofer diffraction patterns of the characters positioned in said beam,
a relatively opaque disc having a radially extending, relatively transparent slit disposed therein, said disc being positioned so that the center of said disc is at said focal point,
means to rotate said disc about said focal point,
means positioned on the opposite side of said disc from said focusing lens for forming images of said characters,
means for sensing images formed by said image forming means in first and second dimensions,
means for generating image position information,
means for generating information indicative of the angular orientation of said slit, and
means for storing said image position information and said slit orientation information for identifying said characters and their location on said surface.

7. Character recognition apparatus comprising, means for generating a beam of parallel light rays along an optical axis,
means for positioning in said beam of parallel light rays a surface including a plurality of characters having different transmissivity characteristics than the remainder of the surface,
each said character being composed of parallel lines disposed at an angle unique to that character,
means for focusing said beam of parallel light rays to a point in said optical axis for forming Fraunhofer diffraction patterns of the characters positioned in said beam,
a relatively opaque disc having a radially extending, relatively transparent slit disposed therein, said disc being positioned so that the center of said disc is at said focal point,
means to rotate said disc about said optical axis,
means positioned on the opposite side of said disc from said focusing lens for forming images of said characters,
means for scanning said image forming means along a first dimension,
a plurality of light sensors aligned in correspondence to a second dimension perpendicular to said first dimension,
means responsive to said scanning means for generating character position information in said first dimension,
means for generating information indicative of the angular orientation of said slit,
means responsive to said light sensors for generating character position information in said second dimension, and means for storing said character position information and said slit orientation information to identify the characters and their location on said surface.

8. The apparatus as claimed in claim 7 wherein said scanning means is a reflector rotatable about an axis perpendicular to said optical axis, and said light sensors are disposed in a line perpendicular to said optical axis.

References Cited by the Examiner

UNITED STATES PATENTS

| | | | |
|---|---|---|---|
| 3,004,465 | 10/1961 | White | 88—14 |
| 3,036,153 | 5/1962 | Day | 178—6 |
| 3,064,519 | 11/1962 | Shelton | 340—146.3 |
| 3,220,298 | 11/1965 | Powell et al. | 250—233 |

FOREIGN PATENTS

| | | |
|---|---|---|
| 1,319,644 | 1/1963 | France. |

OTHER REFERENCES

"The Role of Optics in Applying Correlation Functions to Pattern Recognition" by Dan McLachlin, Jr., Journal of the Optical Society of America, vol. 52, No. 4, April 1962, pp. 454–459.

MAYNARD R. WILBUR, *Primary Examiner.*

MALCOLM A. MORRISON, *Examiner.*

J. E. SMITH, *Assistant Examiner.*